United States Patent [19]
Masatsugu et al.

[11] Patent Number: 5,848,795
[45] Date of Patent: Dec. 15, 1998

[54] FRONT PART REPLACEMENT TYPE FINGER CHUCK

[75] Inventors: Naoyuki Masatsugu; Ikuhisa Fujii, both of Fuchu; Kazuhisa Miyaka, Aichi-ken, all of Japan

[73] Assignees: Kitagawa Iron Works Co., Ltd., Fuchu; Okuma Corporation, Nagoya, both of Japan

[21] Appl. No.: 722,623

[22] Filed: Sep. 27, 1996

[30] Foreign Application Priority Data

Sep. 30, 1995 [JP] Japan .................................. 7-289077

[51] Int. Cl.⁶ ...................................................... B23B 31/18
[52] U.S. Cl. ........................... 279/137; 279/106; 279/133; 279/141; 279/143; 279/156
[58] Field of Search .............. 279/77, 106, 109, 279/133, 137, 141, 143, 145, 156, 158

[56] References Cited

U.S. PATENT DOCUMENTS

| | | | |
|---|---|---|---|
| 2,781,199 | 2/1957 | Veldhuizen ................................ | 279/77 |
| 4,647,051 | 3/1987 | Stone et al. ............................. | 279/143 |
| 4,685,687 | 8/1987 | Hall et al. ............................... | 279/143 |
| 4,688,810 | 8/1987 | Waite ...................................... | 279/143 |
| 4,838,561 | 6/1989 | Baranzelli et al. ...................... | 279/133 |
| 5,464,233 | 11/1995 | Hanai ....................................... | 279/141 |
| 5,503,508 | 4/1996 | Amiguet et al. ......................... | 279/137 |

*Primary Examiner*—Steven C. Bishop
*Attorney, Agent, or Firm*—Lane, Aitken & McCann

[57] ABSTRACT

Even though the shape and size of an aluminum wheel to be chucked for machining is changed, it is possible to easily deal with this situation and to simply chuck the same. In a finger chuck which finger levers 5 are swingably mounted in the radius direction via fulcrum point parts 8 installed at adequately spaced positions in the circumferential direction of the outer circumference of a chuck body, the front end face part of the chuck body front part, which constitutes the front portion of said fulcrum point parts, is eliminated, a plurality of front end face parts 12 which are intended to be selectively replaced and mounted at said eliminated portion are formed integral with each other, and at this time said plurality of front end face parts are provided with a clamp seat 14 and a centering member 23 so that each of said front end face parts can be applied to specified kinds of different workpieces w.

14 Claims, 12 Drawing Sheets

FIG. II

FRONT PART REPLACEMENT TYPE FINGER CHUCK

FIELD OF THE INVENTION

The present invention relates to a finger chuck fixed at the spindle of a lathe, etc., and in particular relates to a front part replacement type finger chuck which is able to make the chuck body front part thereof replaceable and mountable.

BACKGROUND ARTS

When cutting an aluminum wheel to be used in a vehicle by means of a lathe, a finger chuck is fixed at the spindle thereof and the aluminum wheel is chucked by said finger chuck.

The following types of finger chucks have been used as the above finger chuck, that is, they are of such a type that finger levers are swingably mounted in the radius direction via fulcrum point parts installed at adequately spaced positions in the circumferential direction of the outer circumferential part of the chuck body as in, for example, Japanese laid open utility model No. 6-33608 of 1994, and such a type that, as in Japanese laid open patent No. 61-244402 of 1986, finger shafts are longitudinally slidably and rotatably around the center line thereof at adequately spaced positions in the circumferential direction of the outer circumferential portion of the chuck body.

In work done according to these prior art, it is necessary to replace a fixture every time, matching the kinds of workpieces. Therefore, it takes much time to remove a number of bolts and to tighten the same. On the other hand, although it is considered that the entire chuck is replaced for a different one, in this case it is necessary to prepare a lifting means such as a crane.

Furthermore, some tools are required to connect the chuck to a draw bar and it also takes much time to do the same.

Since this work must be done on a lathe, the running efficiency of the lathe is lowered, thereby hindering the production efficiency.

A number of aluminum wheels of different shapes and sizes have been produced. However, with one type of any of the conventional finger chucks described above, it is possible to easily chuck many kinds of aluminum wheels speedily.

Therefore, in cases where the kind of aluminum wheels which are streaming on a production line is suddenly changed, it will be necessary to replace the entire finger chuck or to disassemble and replace many components of the finger chuck every time. This is a major factor to hinder the production efficiency.

SUMMARY OF THE INVENTION AND ADVANTAGES

It is therefore an object of the present invention to provide a front part replacement type finger chuck which can eliminate these disadvantages and shortcomings.

In order to achieve the abovementioned object of this invention, a front part replacement type finger chuck according to the first invention is characterized in that in a front part replacement type finger chuck in which finger levers are swingably mounted in the radius direction via fulcrum point parts installed at adequately spaced positions in the circumferential direction of the outer circumference of a chuck body, the front end face part of the chuck body front part, which constitutes the front portion of said fulcrum point parts, is eliminated, a plurality of front end face parts which are intended to be selectively replaced and mounted at said eliminated portion are formed, and at this time said plurality of front end face parts are provided with a clamp seat and a centering member so that each of said front end face parts can be applied to specified kinds of different workpieces.

With the second invention, a front part replacement type finger chuck in which finger shafts are longitudinally slidably and rotatably mounted at adequately spaced positions in the circumferential direction of the outer circumference of a chuck body is characterized in that the portions inside the finger shaft existing positions in the radius direction is roughly circularly eliminated at the front end face part of said chuck body, a plurality of front end face parts which are selectively replaced and mounted at said eliminated portion and correspond to the eliminated portion are formed integral with each other, and at this time said plurality of front end face parts are provided with a clamp seat and a centering member so that each of said front end face parts can be applied to specified kinds of different workpieces.

These features of the invention are able to be embodied as shown below: with the first invention described above, a tapered face concentric with the center of rotations is formed at the rear side of the front end face part, a pin having an engaging dent formed at the circumferential face at adequately spaced positions in the circumferential direction at an adequate radius position at said rear side is fixed while a taper mating face, which is fitted in said tapered face, is formed at the front face of the chuck body which has said front end face part eliminated, and a hole into which said pin is inserted, and a rotation operating rod which stops said pin in a tensile state by being engaged with said engaging dent of said pin are provided.

On the other hand, with the second invention, a tapered face concentric with the center of rotations is formed at the rear side of the front end face part, a pin having an engaging dent formed at the circumferential face at adequately spaced positions in the circumferential direction at an adequate radius position at said rear side is fixed while a taper mating face, which is fitted in said tapered face, is formed at the front face of the chuck body which has said front end face part eliminated, and a hole into which said pin is inserted, and a rotation operating rod which stops said pin in a tensile state by being engaged with said engaging dent of said pin are provided.

Furthermore, the first invention may be modified as shown below: a chuck body front part which forms the portion forward of the backward part of the fulcrum point part of finger levers is eliminated, a plurality of chuck body front parts which are intended to be selectively replaced and mounted at said eliminated part are formed integral with each other, and said plurality of chuck body front parts are provided with a finer lever via the fulcrum point part at the outer circumference thereof and a clamp seat and a centering member at the front portion thereof, so that said chuck body front parts are applicable to specified kinds of workpieces which are different from each other.

At this time, more concretely, in compliance with the abovementioned invention, a tapered face which is concentric with the center of rotations is formed at the rear face of the chuck body front part which forms the portion forward of the rearward position of the fulcrum point part of the finger chuck, a taper mating face, which is fitted in said tapered face, is formed at the front face of the chuck body where the chuck body front part is eliminated, a pin which has an engaging dent at the circumferential face is fixed at adequately spaced positions in an adequate radius direction at any one of the rear face of said chuck body front part and the front face of said chuck body, and at the other thereof, a taper mating face to which said tapered face is fitted is formed at the other thereof, and a hole into which said pin is inserted and a rotation operating rod which is engaged with the engaging dent of said pin and stops the same in a tensile state are provided.

A centering member in each of the inventions may be formed in various shapes. However, for example, a collet chuck which is concentric with the center of rotations of the front end face part of the chuck body front part is provided at the front end face part thereof, and the collet may be made a centering member.

With a finger chuck according to the invention, even though the shape and size of an aluminum wheel being a workpiece to be chucked for machining is suddenly changed, it is possible to simply and quickly deal with such a situation by replacing the front end face part, front end face major part of a chuck body or the chuck body front part including the same all together. The production efficiency in machining operations by a lathe, etc. can be greatly improved.

Especially, it is possible to easily deal with various variations (three-claw chuck, collet chuck and dead center, etc.) as a work centering member. Furthermore, since it is possible to carry out a centering work outside a machine tool by a unit-by-unit assembled front end face part, the centering accuracy is able to be improved. Still furthermore, it is also possible to replace the centering members and clamp seats, etc., even while a machine tool is running. That is, there are many advantages in this finger chuck according to the invention.

According to a finger chuck according to the present invention, since the front end face part or front end face major part which are mounted at the chuck body part after replacement are not provided with finger levers and finger shafts, the weight thereof is lightened, and the replacement and mounting thereof can be easily performed.

According to a finger chuck according to the present invention, with a simplified operation of inserting a pin in a pin hole and operating the rotations of a rotation operating rod, it is possible to easily replace and mount the front end face part or front end face major part of the chuck body.

According to a finger chuck according to the present invention, since a chuck body front part to be replaced and mounted is provided with finger chucks, it is possible to change the disposition of finger levers and fulcrum point part thereof by replacing the chuck body front part, whereby it is possible to deal with a case where the shape and size of a workpiece are changed in a large range.

According to a finger chuck according to the present invention, it is possible to replace and mount the chuck body front part by the operations similar to those in a finger chuck defined in claim 3.

According to a finger chuck according to the present invention, it is possible to positively chuck the center part of a workpiece by a collet.

BRIEF DESCRIPTION OF THE DRAWINGS

Other advantages of the present invention will be readily appreciated as the same becomes better understood by reference to the following detailed description when considered in conjunction with the accompanying drawings wherein.

DESCRIPTION OF PREFERRED EMBODIMENTS

Figure 1:
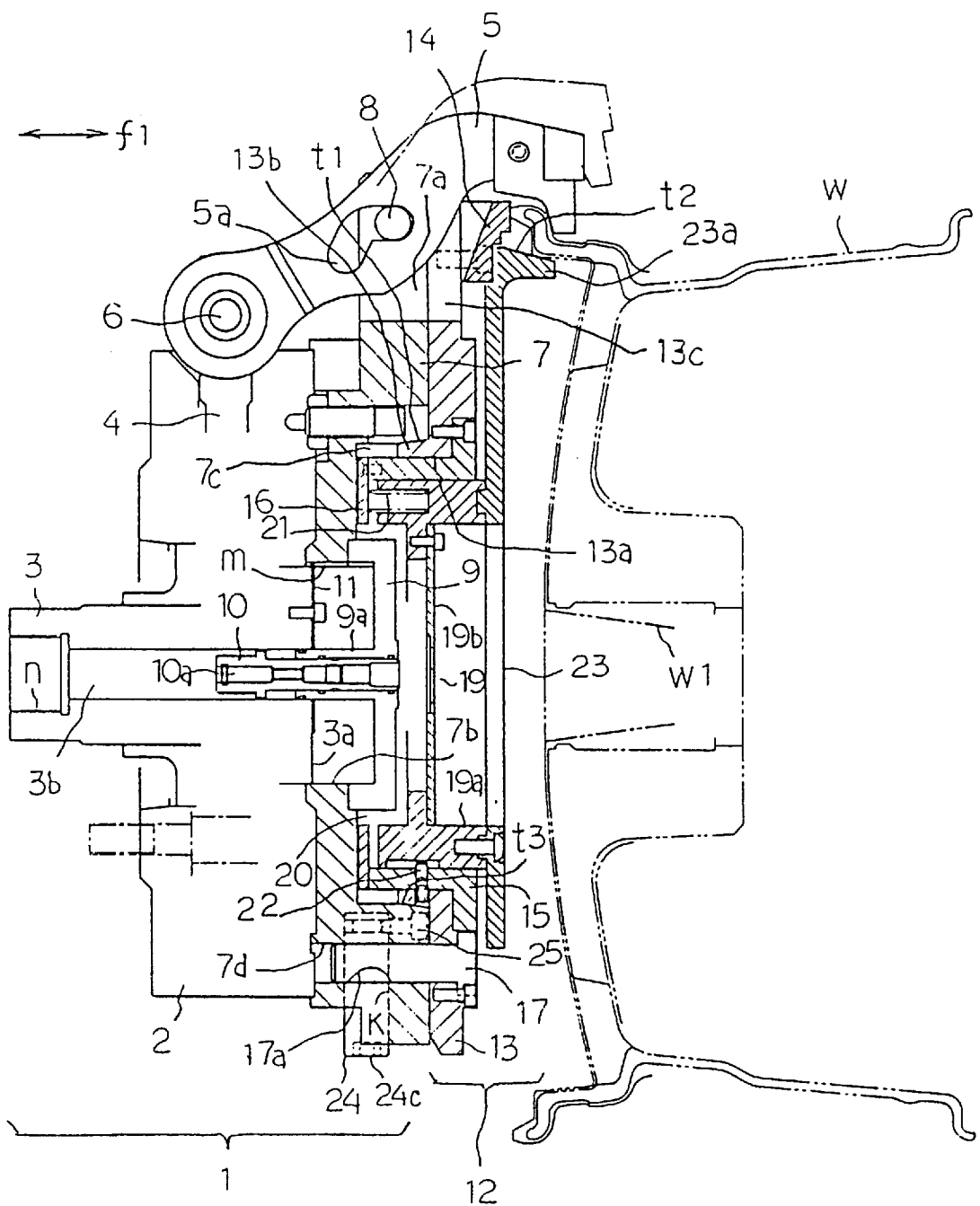
FIG. 1 is a longitudinally sectional view of a finger chuck according to a first preferred embodiment of the invention.
Figure 2:
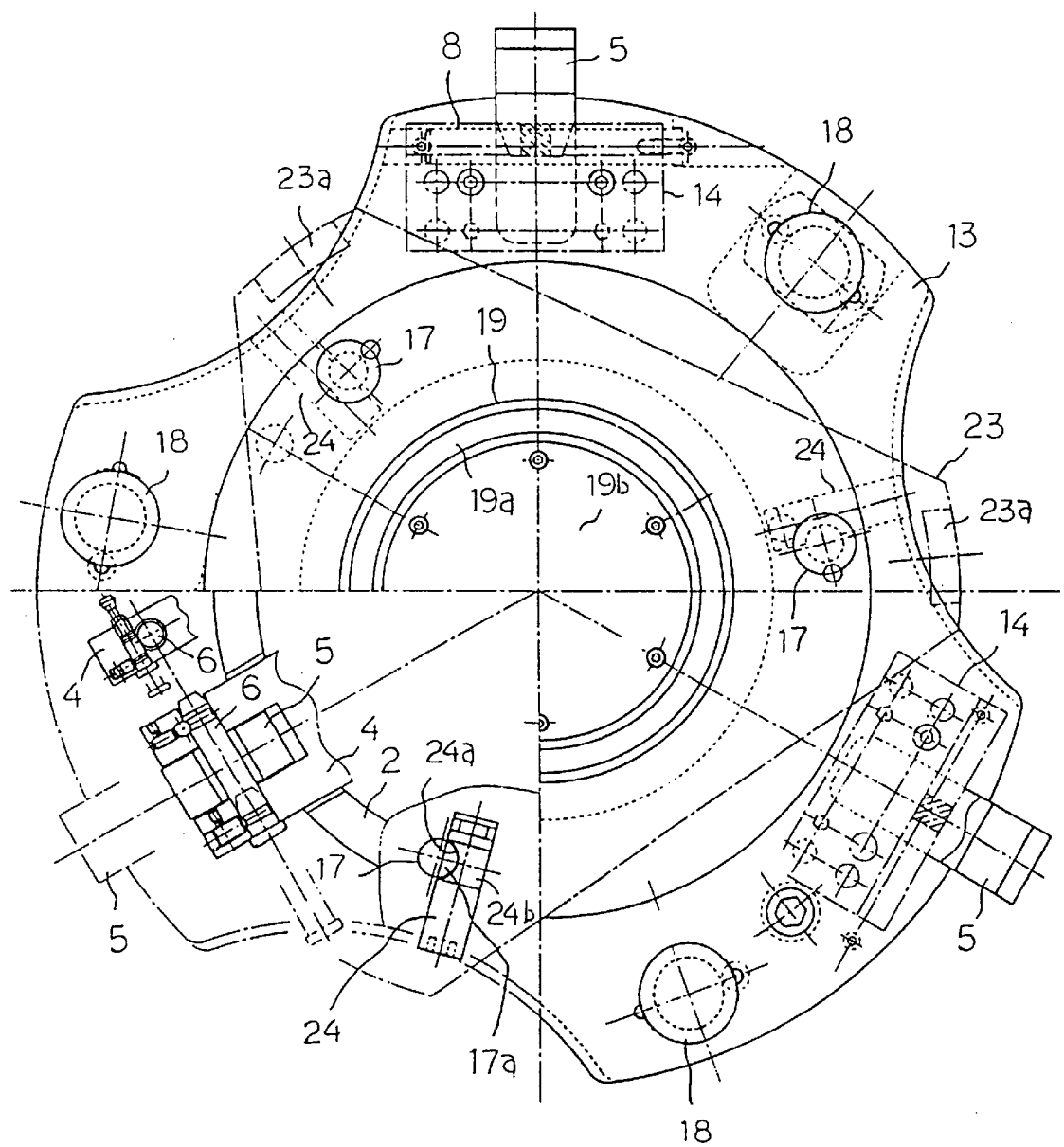
FIG. 2 is a front elevational view of a finger chuck according to the same first preferred embodiment.
Figure 3:
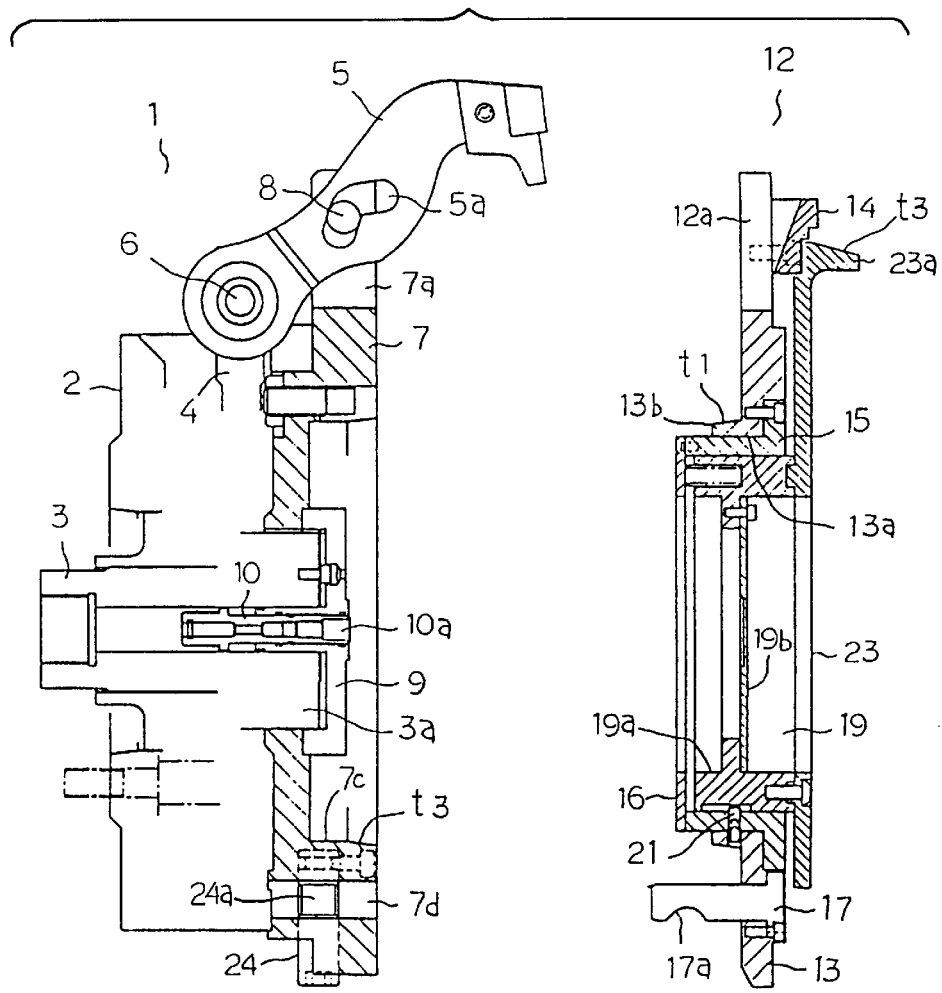
FIG. 3 is a longitudinally sectional view showing a state where the front end face part of the finger chuck according to the same first preferred embodiment is separated.

Firstly, a first preferred embodiment of a finger chuck according to the invention is described. FIG. 1 is a longitudinally sectional view of the same finger chuck, FIG. 2 is a front elevational view of the same finger chuck, and FIG. 3 is a cross-sectional view showing a state where a part of the same finger chuck is separated.

In these drawings, 1 is the base part of a chuck body with the front end face part of an already-known finger chuck (for example, Japanese laid-open utility model No. 33608 of 1994) eliminated.

A description is given below of a detailed construction of said base part 1.

Namely, 2 is a cylindrical casing member, and a cylindrical sliding body 3 which is slidably displaced in the longitudinal direction f1 is provided at the center of rotation of said cylindrical casing member. 4 is a yoke which moves longitudinally to interlock with said cylindrical sliding body 3, and said yoke is connected to the base end of finger lever 5 via an axis 6.

7 is a roughly disk-shaped front plate member fixed at the casing member 2, and a fulcrum point part of said finger lever 5 is formed at adequately spaced positions in the circumferential direction of the outer circumferential part.

The fulcrum point part illustrated in the drawings is such that a supporting axis 8 is applied at a notched part 7a of said front plate member 7 in the circumferential direction.

Said supporting axis 8 is inserted into a curved through hole 5a provided at the central part in the length direction of said finger lever 5, and said finger lever is able to swing in the radius direction of rotation of the chuck body, centering around said supporting axis 8.

7b is a through hole provided at the center position of said front plate member 7A partitioning guide member 9 which closes said through hole 7b is fixed with bolts at the front side of said through hole 7b. 9a is a guide axial part formed at said partitioning guide member 9 in which a flow path member 10 having a fluid path 10a formed as a center opening is fitted.

The front side swelled portion 3a of said cylindrical sliding body 3 is slidably inserted in the longitudinal direction between the inner circumference of said through hole 7b and the outer circumference of said guide axial part 9a. At this time, 11 is a rotation regulating plate bolt-fixed at the front side of said front side swelled part 3a, whereby the front end thereof is engaged with a linear groove m at the through hole 7b side.

The base part 1 is constructed as described above. One of various kinds of front end face parts 12 described later is detachably attached to the front side of the base part 1.

A description is given below of a detailed construction of said front end face part 12 with reference to the illustrated example.

That is, 13 is a front face plate closely adhered to the front side of the front plate member 7, and the shape of the outer circumferential part thereof in the frontal view is identical to that of the front plate member 7. A staged center hole 13a is formed at the center position thereof, and at the same time an annular projecting part 13b whose outer circumferential face is a tapered surface t1 is formed backward of said center hole 13a.

A clamp seat 14 whose height is made plurally stepped is bolt-fixed at the notched part 13c of said front face plate 13a flanged cylinder member 15 is internally fitted in the center hole 13A and bolt-fixed. Simultaneously, a ring member 16 is fixed with bolts at the rear end face of said cylinder member 15, wherein said clamp seat 14 may be formed integrally with the front face plate 13.

17 are pins bolt-fixed at adequately spaced positions in the circumferential direction of the outer circumferential part of said front face plate 13, and an engaging dent 17a is formed at one side (in FIG. 1, shown with the position changed) in the circumferential direction of the front face plate 13 at the circumferential face of the front end thereof.

18 is a seating sensing stud and is installed displaceably backward against the force of spring (not illustrated) at an adequately spaced position in the circumferential direction of the front face outer circumferential part.

19 is a piston body internally inserted into said cylinder member 15 and consists of a cylindrical sliding body 19a and a closing plate 19b bolt-fixed so that the center hole of said cylindrical sliding body 19a, while 20 is a cylinder chamber which is closed by said cylinder member 15, piston body 19, front plate member 7, partitioning guide member 9, etc.

21 is a spring, one end of which is supported at said ring plate 16, and said spring 20 presses said piston body 19 forward. 22 is an engaging pin fixed at said cylinder member 15 which is used to limit the moving distance of said piston body 19.

23 is a roughly triangular plate-like centering member bolt-fixed at the front side of said piston body 19, wherein a projection 23a is provided at each of the top parts, and the outer circumferential face of this projection 23a is made a tapered surface t2.

One example of the front end face part 12 is constructed as shown above. The position and shape of the front face plate 13 such as the clamp seat 14, projection 13, etc. in the radius direction of rotation thereof may be made different as necessary according to each of the front end face parts 12.

A means for detachably connecting the front end face part 12 is provided at the abovementioned base part 1, and a detailed example thereof is described below.

Figure 4A:
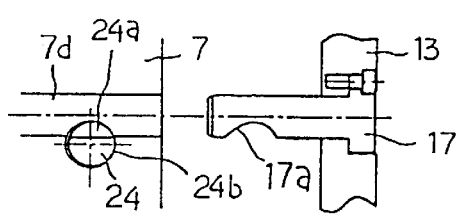
FIG. 4 is a view showing the relationship between a pin, pin hole and rotation operating rod of the same finger chuck, wherein A shows a state where a pin is inserted into a pin hole and B shows a state where the pin is inserted into the pin hole and continuously connected to each other.

That is, a dent hole 7c is formed at the center position of said front plate member 7, and the inner circumferential face thereof is made a taper mating face t3 to which said tapered face t1 is closely adhered. A pin hole 7d is formed at the front side of said front plate member 7 corresponding to said pin 17, and a hole k is formed from the circumferential side of said front plate member 7 in the direction orthogonal to said pin hole 7d, whereby a rotation operating rod 24 is rotatably and displaceably fitted in this hole k. 25 is an engaging pin fixed at the front plate member 7 which is engaged with an annular groove formed on the circumferential face of said rotation operating rod 24 to allow said rotation operating rod 24 to be rotated and displaced at only a fixed position. Said rotation operating rod 24 has a notched part 24a formed relative to said engaging dent 17a of said pin 17 at the circumference as shown in FIG. 4A, etc. The circumferential part 24b where said notched part 24a exists is made a cam surface by which said engaging dent 17a is pulled rearward. In addition thereto, a wrench hole 24c is formed at the upper end thereof.

A usage and actions of a finger chuck according to the invention, which is constructed as described above, are explained below.

An operator fixes the base part 1 of the finger chuck at the spindle of a lathe prior to starting a machining, and at the same time selects a front end face part 12 suited to the shape and size of an aluminum wheel w being a workpiece to be machined, whereby the operator manually moves the front end face part 12 to cause three pins 17 thereof to be respectively located in said pin holes 7d. At this time, since the relationship between said pins 17 and the notched parts 24 of a rotation operating rod 24a is established in such a state as shown in FIG. 4A in advance, the rotation operating rod 24 does not hinder insertion of the pins 17, and it is possible for the rear side of the front end face part 12 to gradually approach to the front side of said front plate member 7.

Figure 4B:
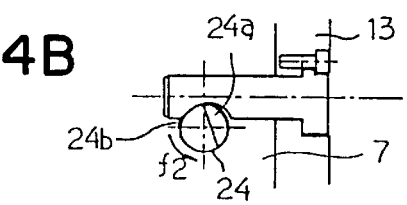

When the rear side of the front end face part 12 is almost brought into contact with the front side of the front plate part 7 by the above operation, the operator rotates the rotation operating rod 24 to as much as necessary in the direction of the arrow f2 in FIG. 4B by using a wrench, whereby the cam surface 24a is caused to come in contact with the engaging dent 17a so as to operate on the pin 17 to be pulled deep in the pin hole 7d. Therefore, the rear side of the front end face part 12 is finally brought into contact with the front side of the front plate part 7, so that the former is firmly fixed on the base part 1.

In this state, by causing the longitudinal drive mechanism (not illustrated) to operate, the cylindrical sliding body 3 is moved forward, whereby the three finger levers 5 are opened with a one-dashed line in FIG. 1. In this state, as shown in the same drawing, the internal circumferential surface of the end face of an aluminum wheel w is externally fitted to the tapered face t2 of the centering member 23, and subsequently the cylindrical sliding body 3 is displaced backward, whereby the finger levers 5 are caused to swing inwardly in the radius direction of rotation of the chuck body and as shown with a solid line in FIG. 1, the finger levers 5 chucks the outer circumference of said aluminum wheel w. On the other hand, the centering member 23 is strongly pressed to the inner circumferential surface of the end face of said aluminum wheel w by a pressing force of the piston body 9, which is generated by a spring 21, whereby said aluminum wheel w is centered without fail. Thus, since the outer circumferential end face of said aluminum wheel w is strongly pressed by three clamp seats 14 and securely seated in a correct position, the three seating detection studs 18 are displaced backward at the same time to interlock therewith. Since a pressure fluid (compressed air) is caused to pass through these seating detection studs 18 via the center hole 3b of the cylindrical sliding body 3 and the fluid path of the path member 10, the path of this pressure fluid is interrupted by a backward displacement of the same studs 18, whereby an appointed seating signal is issued.

After this seating is confirmed, the operator causes the spindle and chuck body to rotate, whereby the rim circumference and center hole w1 of said aluminum wheel w are machined.

After the operation is finished, the spindle is caused to stop its rotations to displace the cylindrical body 3 backward, whereby the finger levers 5 are moved in the reverse order of the above description to release the outer circumference of said aluminum wheel w as shown with a one-dashed line in FIG. 1. In this state, the operator removes said aluminum wheel w from the chuck, whereby the outer circumferential end face of said aluminum wheel w is parted from the clamp seat 14, and simultaneously the seating detection studs 18 are reset to their original state to cause the seating signals to be terminated.

Subsequently, the above operations are repeated for each of the aluminum wheels to be machined. It is necessary to machine aluminum wheels w of shapes and sizes which are different from the former one. In this case, the operator firstly removes only the front end face part 12 by reversely carrying out the attaching procedures of the front end face part 12 described above. Continuously, a suitable front end face part 12 is selected from among the front end face parts 12 prepared in advance in the vicinity of a lathe. After the same is mounted as in the above description, the next aluminum wheel w is machined.

Figure 5:
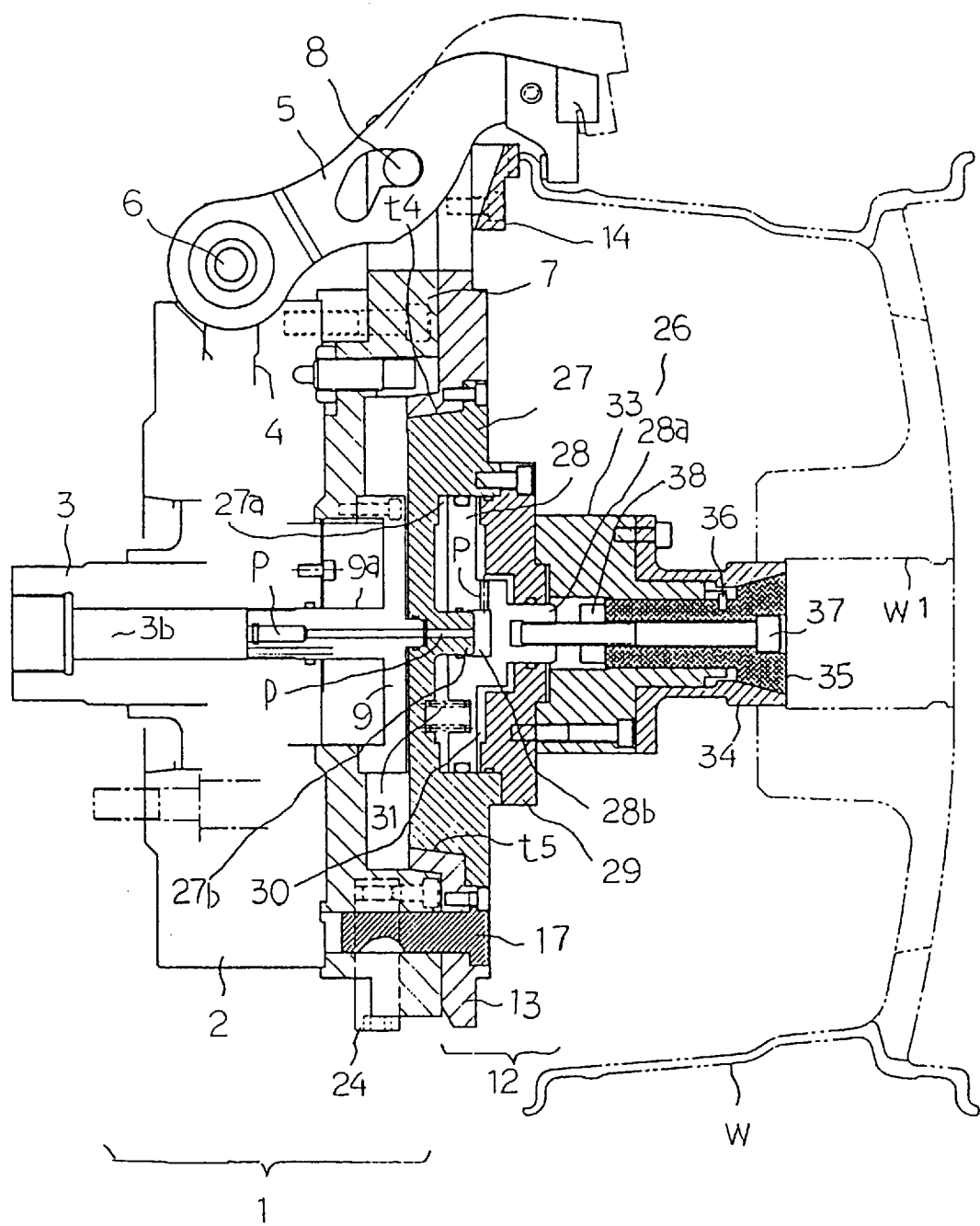
FIG. 5 is a longitudinally sectional view showing a modified example of a finger chuck according to the first preferred embodiment.
Figure 6:
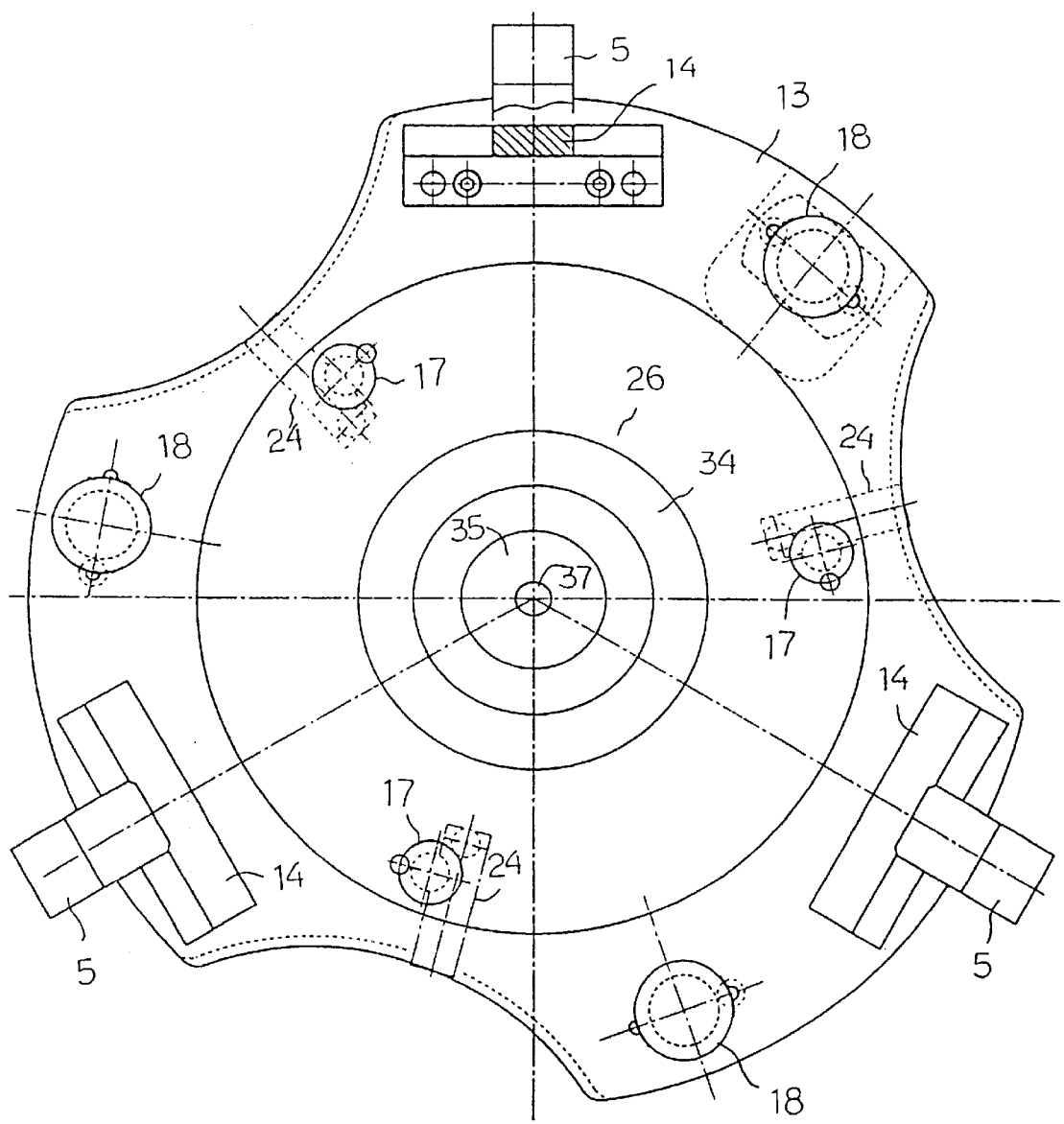
FIG. 6 is a front elevational view showing a modified example of a finger chuck according to the same first preferred embodiment.

The above preferred embodiment may be modified as shown in FIG. 5 and FIG. 6. FIG. 5 is a longitudinally sectional view of a chuck, and FIG. 6 is a front elevational view of said chuck.

The chuck illustrated is identical to that of the above preferred embodiment, excepting that a collet chuck 26 is provided at the front central part of the front end face part 12. The features thereof are as described below.

That is, a disk-shaped cylinder plate 27 is provided at the center part of the front plate 13, and said cylinder plate 27 has a piston insertion hole 27a installed at the front side thereof, and the outer circumference is made a tapered face t4.

A taper mating face t5, to which said tapered face t4 is closely adhered, is formed at the inner circumferential surface of the center hole of the front plate 13, whereby the cylinder plate 27 is retained to be concentric with the center of rotations of the front plate 13 by these two tapered faces t4, t5, and is fixed to the front plate 13 with bolts. 28 is a piston inserted into said insertion hole 27a, which has a projection 28a at the front side thereof and a a fitting hole into which said projection 27b formed on the bottom surface of the insertion hole 27a is inserted, at the rear side thereof.

29 is a cylinder cover which covers said insertion hole 27a. The cylinder cover 29 has a through hole, into which said projection 28a is inserted, provided at the center part thereof.

Thus, a cylinder chamber 30 is formed at the front side of the piston 28. However, this cylinder chamber 30 is caused to communicate with the center hole 3b of cylindrical sliding body 3 via a flow path p formed at each of cylinder plate 27, piston 28 and partitioning guide member 9.

31 is a spring which presses the piston 28 forward, 33 is a staged supporting pipe which is fixed at the cylinder cover 29 with bolts, and 34 is a collet fixed at this supporting pipe 33 with bolts, which is constructed so that a split groove is formed at adequately spaced positions in the circumferential direction of the front side of the cylindrical body made of an elastic material.

35 is a collet plunger which is displaceably and slidably inserted into the collet 34 and supporting pipe 33 and whose circumferential displacement is regulated by a pin 36 engaged with the collet 34. The collet plunger 35 is connected to the piston 28 with bolts 37 and nuts 38.

When a finger chuck which is constructed, as shown above, according to the invention, the aluminum wheel w which has been machined by using a chuck according to the preceding embodiment is reversed as shown in FIG. 5 in order to cause the center hole w1 thereof to be outwardly fitted to the collet 34, and the finger levers 5 are chucked and operated, as described above, with the outer end face of said aluminum wheel w pressed to the clamp seat 14 side. Simultaneously, compressed air is supplied into the cylinder chamber 30 through the center hole 3b of the cylindrical sliding body 3. Thereby, the piston 28 which moved forward up to this moment is caused to move backward against a force of the spring 31 by the fluid pressure. In conjunction therewith, the collet plunger 35 is moved backward as well. For this reason, the collet is expanded, whereby the aluminum wheel is accurately centered and fixed. The finger levers 5 firmly grasp the circumferential edge of the same aluminum wheel.

The operator is able to machine the other side of the rim of aluminum wheel w. After the work is finished, the finger levers 5 are released as described above, and at the same time the pressure fluid is discharged from the cylinder chamber 30 to cause the collet 34 to contract, whereby the same wheel is taken out.

Figure 7:
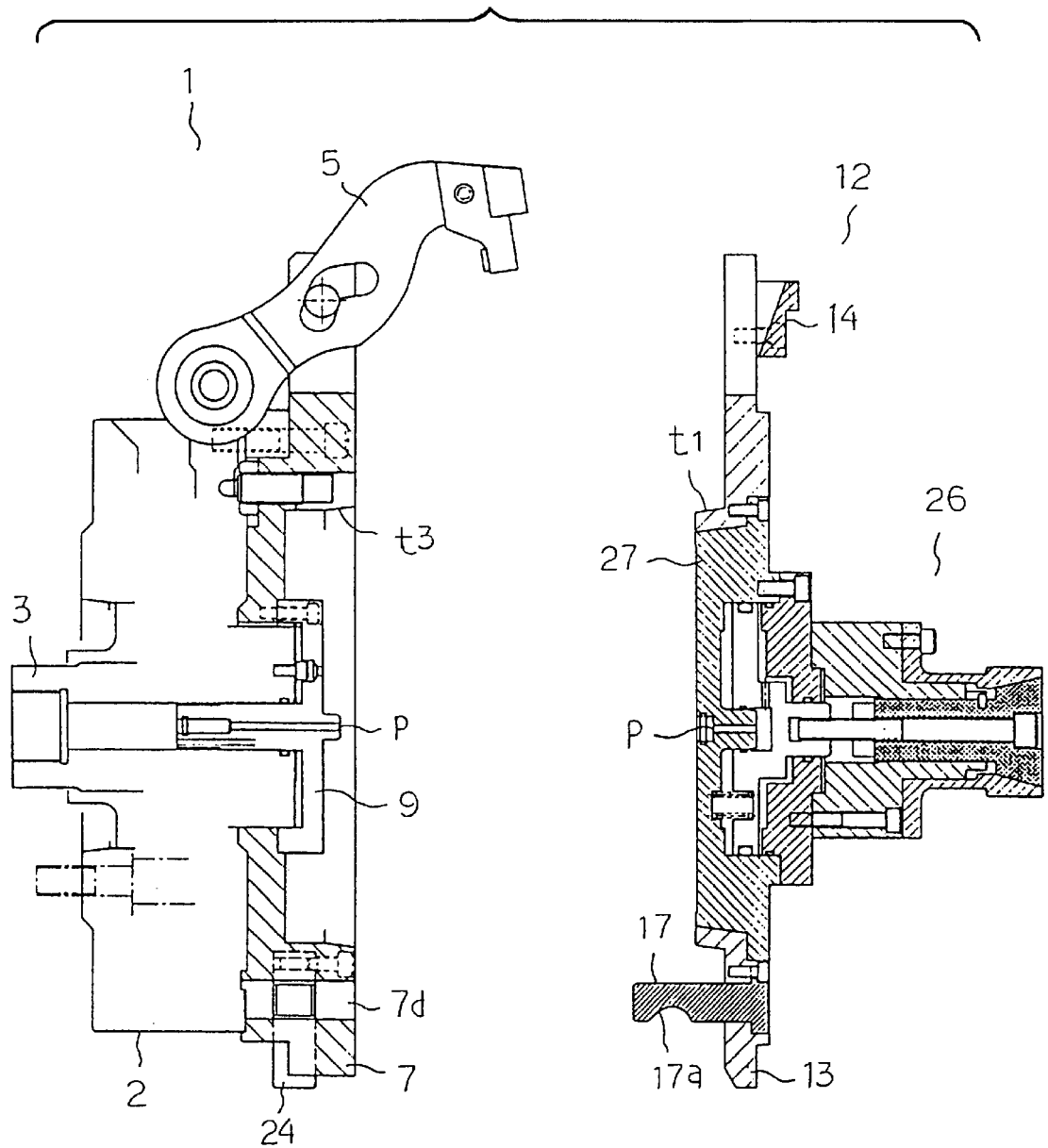
FIG. 7 is a sectional view showing a state where the front end face part of the modified example of the finger chuck according to the same first preferred embodiment is separated.

The state where the front end face part 12 is removed from the base part 1 is as shown in FIG. 7.

Figure 8:
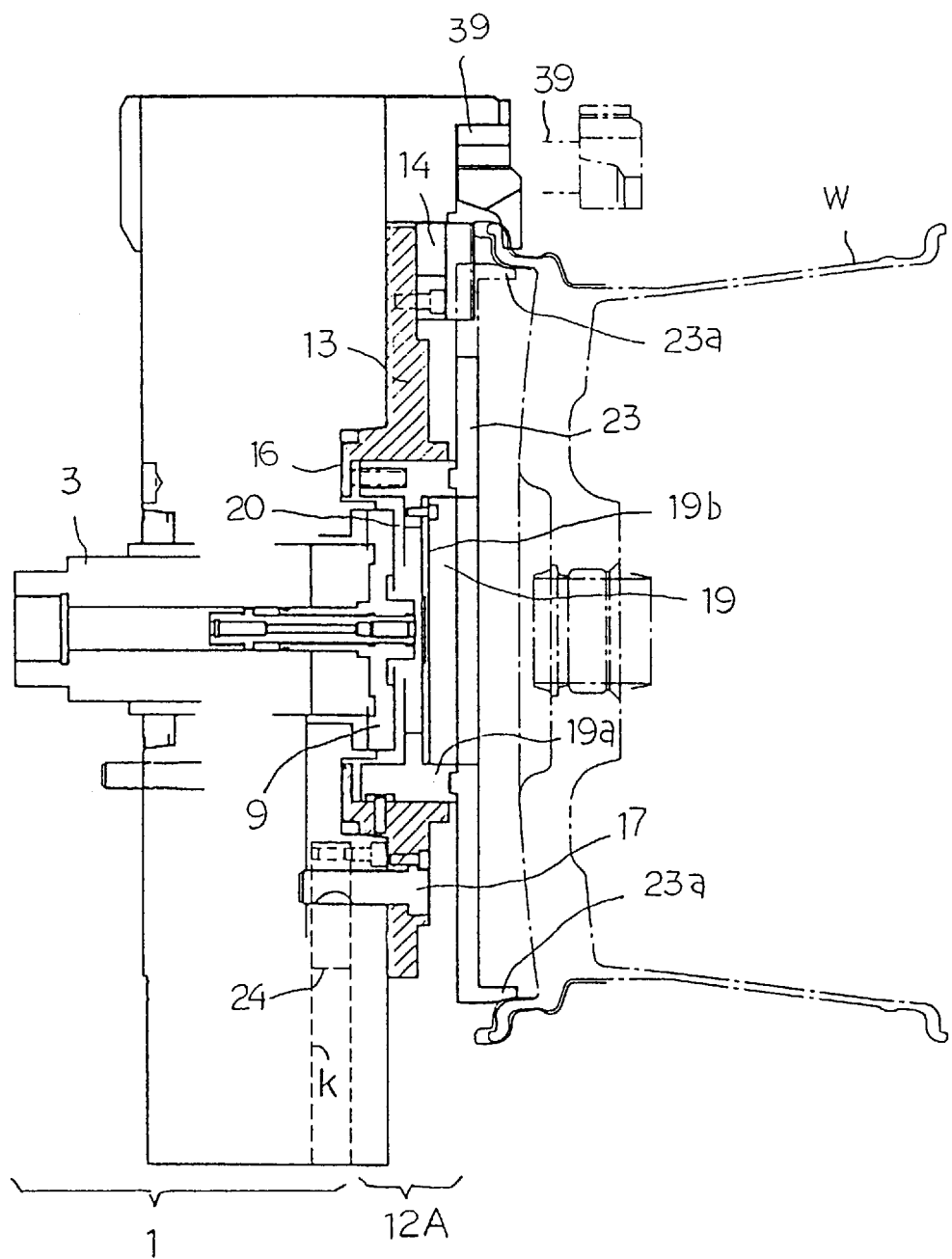
FIG. 8 is a longitudinally sectional view of a finger chuck according to a second preferred embodiment of the invention.
Figure 9:
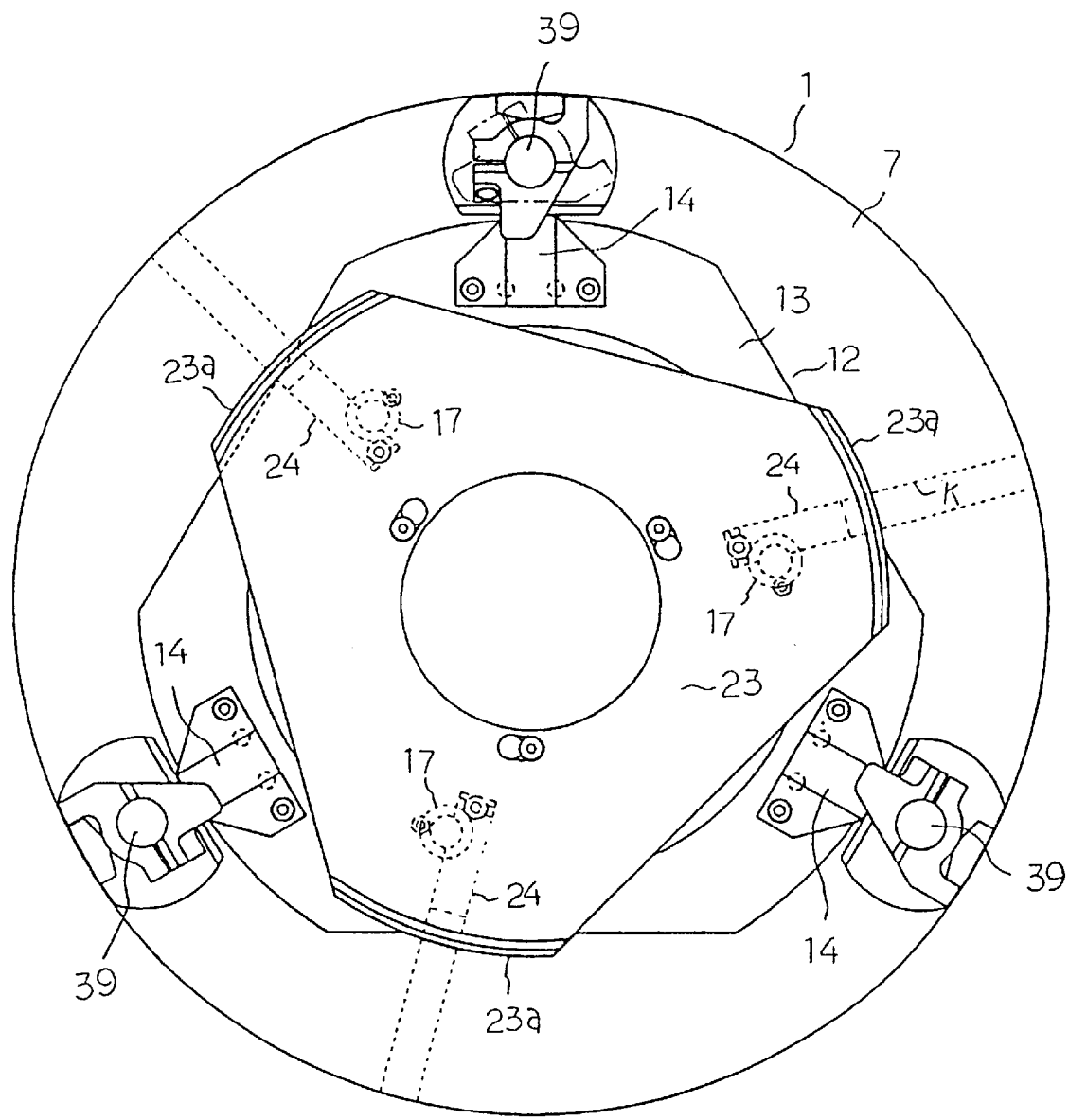
FIG. 9 is a front elevational view of a finger chuck according to the same preferred embodiment.

A description is given of a second preferred embodiment of a finger chuck according to the invention. FIG. 8 is a longitudinally sectional view of the same chuck, and FIG. 9 is a front elevational view of the same chuck.

As an already known finger chuck (For example, Japanese laid open patent No. 244404 of 1986), there is a finger chuck in which finger chucks are mounted at adequately spaced positions in the circumferential direction of the outer circumference of the chuck body so that they are longitudinally slidable and rotatable. The base part 1 of the second preferred embodiment consists of a front end face part employed in such an already known finger chuck and is constructed so that the portion inside the existing position of the finger chucks 39 in the radius direction is roughly circularly cut off.

A front end face part 12A which is intended to be selectively replaced and mounted in accordance with the preceding embodiment is formed at the eliminated portion, and this front end face part 12A is substantially identical to the front end face part 12 of the first preferred embodiment, excepting that only the outer circumferential shape of the front face plate 13 is different from that of the first embodiment in conjunction with the construction of the base part 1.

As in the preceding preferred embodiment, a pin 17 and a rotation operating rod 24, etc. which are used to detachably mount the front end face part 12A at the base part 1 are provided at the front end face part 12A and base part 1.

Figure 10:
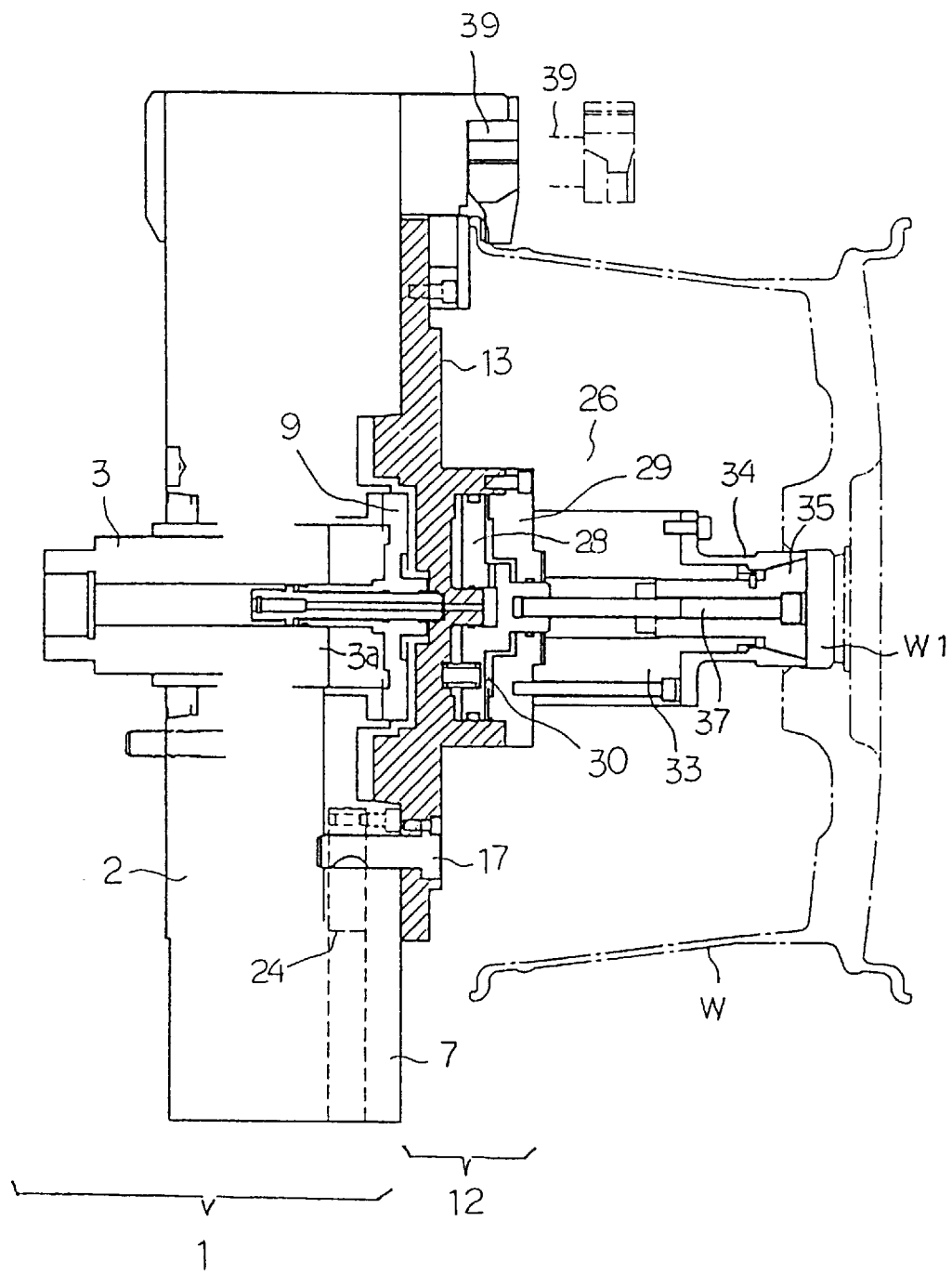
FIG. 10 is a longitudinally sectional view of a finger chuck of a modified example of the same second preferred embodiment.
Figure 11:
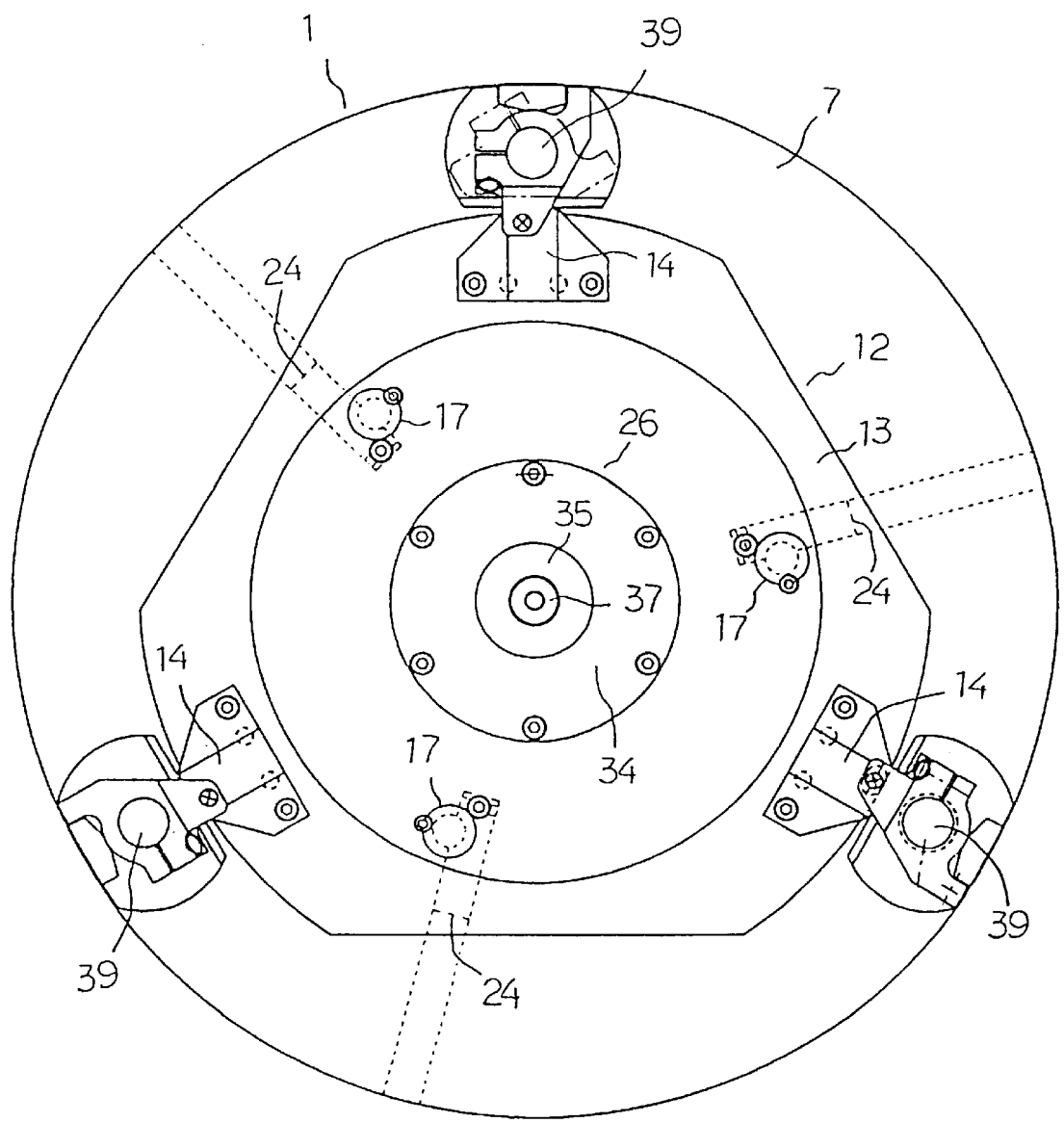
FIG. 11 is a front elevational view of a finger chuck of the modified example of the same second preferred embodiment.

A finger chuck according to the second preferred embodiment may be modified as shown in FIG. 10 and FIG. 11. FIG. 10 is a longitudinally sectional view of the same chuck, and FIG. 11 is a front elevational view thereof.

The construction of this chuck is characterized in that a collet chuck 26 is provided at the center part of the front face plate 13 in compliance with that shown in FIG. 5 and FIG. 6.

Two kinds of chucks shown in FIG. 8 to FIG. 11 are substantially identical to the already described chucks corresponding to the chuck shown in each of the drawings, excepting that the finger levers 5 are replaced for finger shafts 39.

Figure 12:
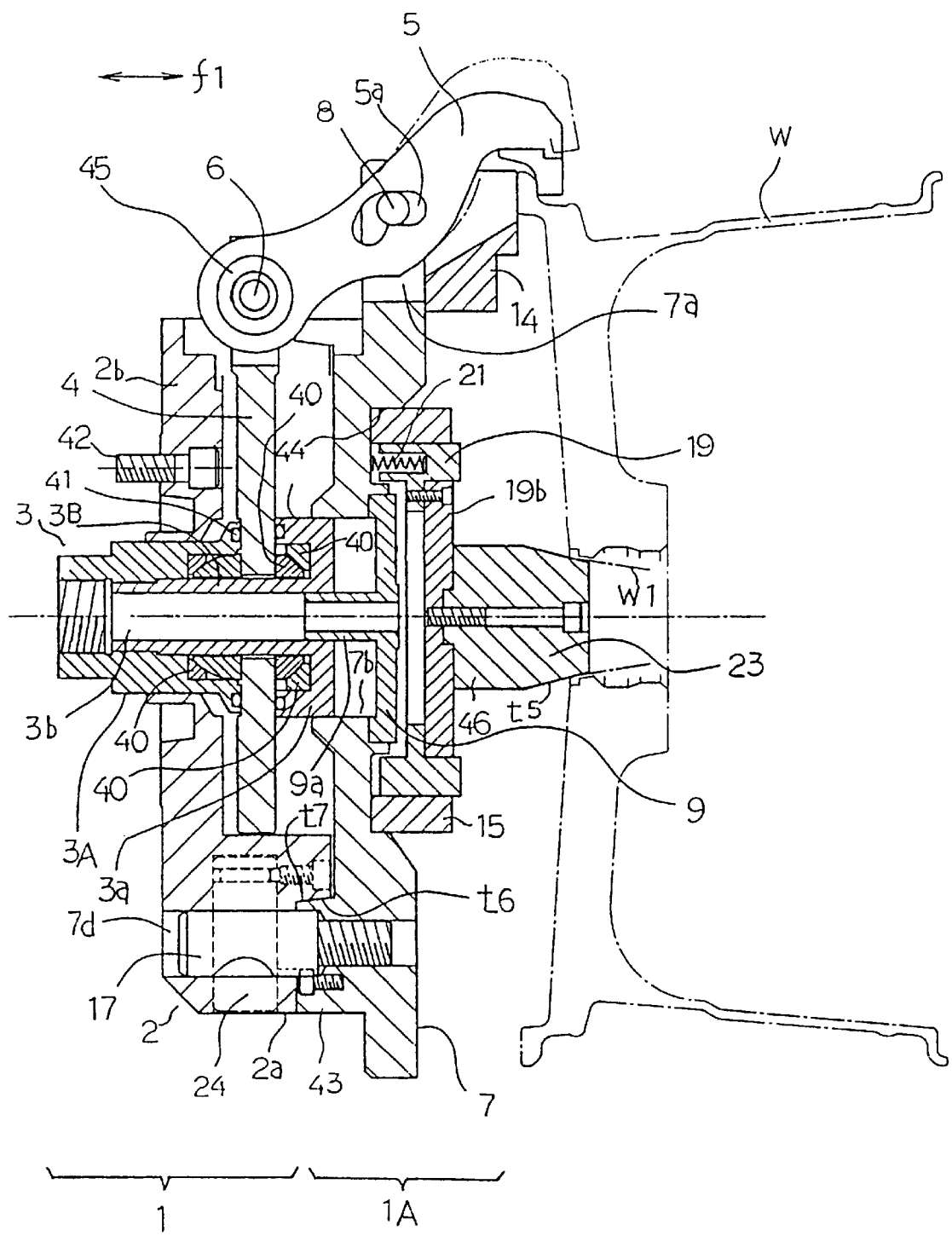
FIG. 12 is a longitudinally sectional view of a finger chuck according to a third preferred embodiment of the invention.
Figure 13:
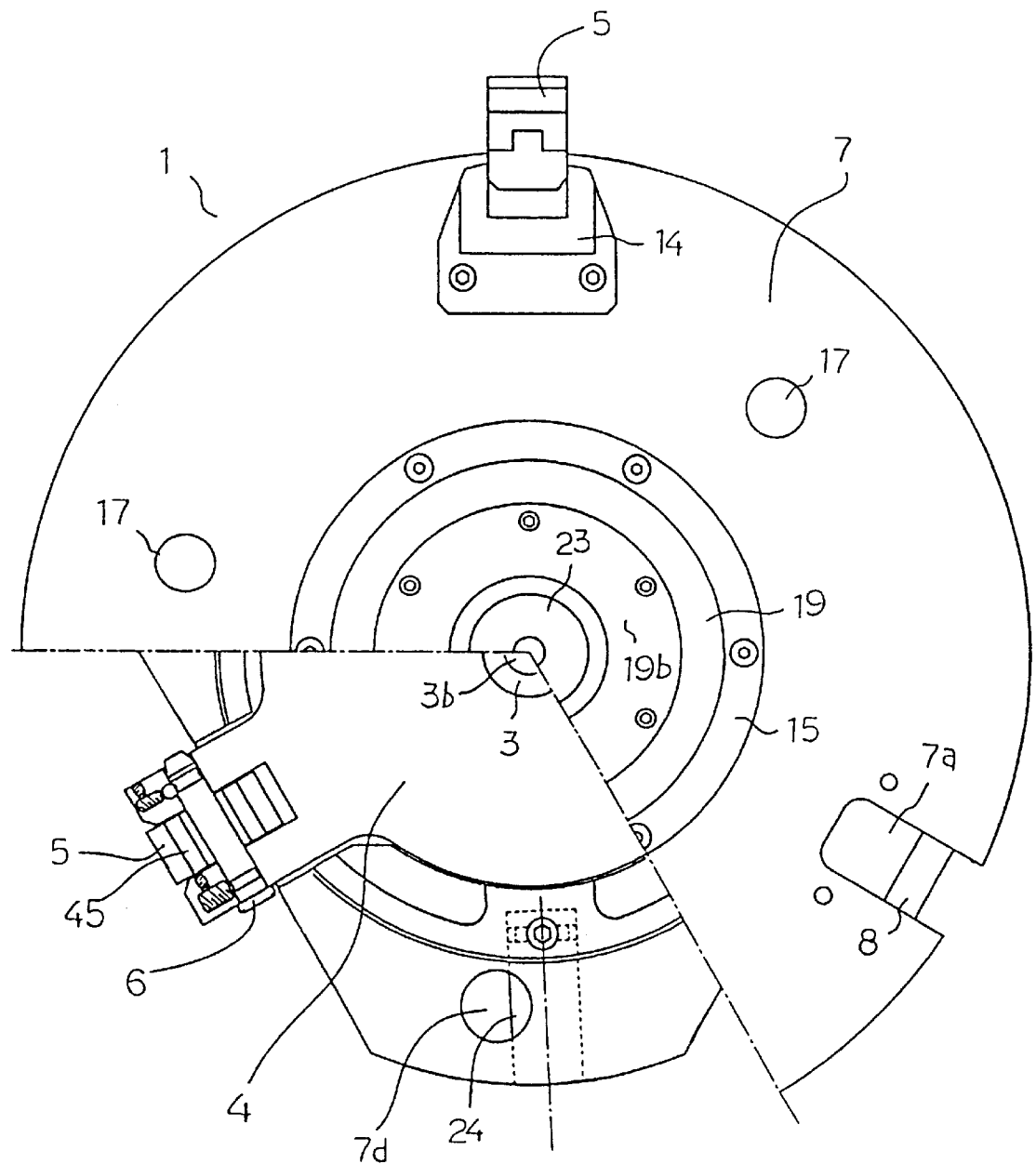
FIG. 13 is a front elevational view of a finger chuck according to the same third preferred embodiment.

Next, a description is given of a third preferred embodiment of a finger chuck according to the invention. FIG. 12 is a longitudinally sectional view of the same finger chuck, and FIG. 13 is a front elevational view thereof.

The rear part of the chuck body, which is the base part 1 of this embodiment is such that the chuck body front part 1A, which forms the position forward of the rear position of the fulcrum point of the finger levers of an already known finger chuck (for example, Japanese laid open utility model No. 33608 of 1994), is cut away.

A concrete construction of the base part 1 is described below.

That is, the cylindrical casing member 2 consists of an outer circumferential part 2a and a rear end face part 2b. A cylindrical sliding body 3 is such that the front member 3A is connected to a staged cylindrical rear member 3B. The center hole 3b is formed at the center position thereof. At this cylindrical sliding body 3, a yoke 4 is mounted, so as to slightly swing in any optional direction, via a spherical supporting member 40 disposed in a space formed by the front member 3A and rear member 3B.

A circumferential axis 6 is mounted at an appointed position of the outer circumferential edge of the yoke 4 in such a state that the same is easily detachable. At this time, 41 is an O ring, 42 is a bolt for fixing the rear end face part 2b at the spindle of a lathe, etc.

The base part 1 is thus constructed, and a plurality of chuck body front parts 1A which are separatable and selectively mounted are formed at the base part 1.

A description is given below of an example of this chuck body front part 1A. That is, finger levers 5 are mounted at the disk-shaped front plate member 7 via the fulcrum points secured at adequately spaced positions in the circumferential direction of the outer circumferential edge, that is, the supporting axes 8 fixed at the notched parts 7a, and at the center part of the rear side, a center hole 7b into which the front side swelled part 3a of said front member 3A is slidably and displaceably inserted is provided. Furthermore, simultaneously, a projection 43 which is fitted into the outer circumferential part of said cylindrical casing member 2 is formed at the outer circumferential edge, and a circular dent hole 44 to which the cylinder member 15 is internally fitted is formed at the center part at the front side thereof. At this time, spherical bearings 45 by which said axis 6 is supported are mounted at the base end of the finger levers 5.

A centering member 23 is fixed with bolts at the closing plate 19b, and they constitutes a column-like block 46 having a tapered face t5.

In order to detachably mount the chuck body front part 1A at the base part 1, a tapered face t6 is formed any one of the rear side of the chuck body front part 1A and the front side of the chuck body rear part 1, and on the other side a taper mating face t7 is formed. A pin 17, pin hole 17d and rotation operating rod 24, which are similar to those already described, are provided. At this time, a clamp seat 14, centering member 23 or finger levers 5 may be modified to various kinds of shapes and sizes for each of the chuck body front parts 1A.

When using a chuck according to this preferred embodiment, the chuck body front part 1A is caused to come near the chuck body rear part 1 by inserting said pin 17 into said pine hole 7d, etc., and at this time, said chuck body front part 1A is made coincident with the centering position of rotations of the chuck body rear part 1 by a guiding action of the tapered face t6 and the taper mating face t7, and finally the same is fixed by rotation operations of the rotation operating rod 24. Thereafter, the finger levers 5 are connected to the yoke 4 by inserting said axis 6 into the center hole of spherical bearing 45.

Continuously, the front edge of the centering member 23 is placed in the center hole w1 of an aluminum wheel w, and since, with the end face of the outer circumferential edge of the aluminum wheel w pressed toward the clamp seat 14 side, the centering member 23 is strongly pressed in the inner circumference at the end face of said aluminum wheel w by a pressing force of said piston body 19, which is generated by said spring 21 as described above, said aluminum wheel w is securely fixed at the front end face of said front plate member 7 with the same securely centered. After the work is finished, the aluminum wheel w is removed in the reverse procedure of the above.

The description of the respective preferred embodiments shows a case where a workpiece such as an aluminum wheel w is manually handled. This manual handling may be robotized.

Furthermore, the abovementioned collet chuck 26 chucks the inner circumference of a workpiece. The same may chuck the outer circumference thereof.

To simplify the description, the parts which are substantially identical to those in different drawings are given the same reference numbers.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specially described.

What is claimed is:

1. A front part replacement type finger chuck in which finger levers are swingably mounted in the radial direction via fulcrum point parts installed at positions spaced in the circumferential direction of the outer circumference of a chuck body, said finger chuck comprising a base portion adapted to be fixed to a spindle of a machine tool and a front end face portion adapted to hold a workpiece having a first configuration, said front end face portion comprising a plurality of front end face parts integral with each other, and the front part replacement type finger chuck further comprising means for releasably fixing said front end face portion to said base portion such that said front end face portion can be removed from said base portion when said base portion is fixed to the spindle of the machine tool.

2. A front part replacement type finger chuck as set forth in claim 1, wherein a tapered face concentric with the center of rotation of the chuck is formed at the rear side of the front end face portion, said means for releasably fixing comprises pins each having an engaging dent formed at a circumferential face of the pin and holes in said rear side of the front end face portion at positions spaced in the circumferential direction of said front end face portion, said pins being receivable in said holes, wherein a taper mating face, which is fitted in said tapered face, is formed at the front face of the chuck body, and said means for releasably fixing further comprises a rotation operating rod holding each said pin in a tensile state by engaging said engaging dent of said pin.

3. A front part replacement type finger chuck as set forth in claim 1, wherein a collet chuck which is concentric with the center of rotation of the front end face portion is provided at the front end face portion, said collet chuck comprising means for centering a workpiece on the front part replacement part finger chuck.

4. A front part replacement type finger chuck as set forth in claim 2, wherein a collet chuck which is concentric with the center of rotation of the front end face portion is provided at the front end face portion, said collet chuck comprising means for centering a workpiece on the front part replacement part finger chuck.

5. The front part replacement type finger chuck of claim 1, wherein said front end face parts include a clamp seat and a centering member.

6. A front part replacement type finger chuck comprising a plurality of chuck body front parts formed integral with each other, said plurality of chuck body front parts being provided with a finger lever at a fulcrum point part at the outer circumference of the chuck body front parts and a clamp seat and a centering member at the front portion of the chuck body front parts, the clamp seat and the centering member being applicable to specified kinds of workpieces which are different from each other.

7. A front part replacement type finger chuck as set forth in claim 6, wherein:

a tapered face concentric with the center of rotation of the chuck is formed at a rear face of a first chuck body front part which has a portion forward of a rearward position of the fulcrum point part of the finger chuck;

a taper mating face is fitted in said tapered face and is formed at a front face of the chuck body;

a pin having an engaging dent at a circumferential face of the pin is fixed at either one of the rear face of said first chuck body front part and the front face of said chuck body, and, at the other thereof, a hole into which said pin is inserted and a rotation operating rod which engages the engaging dent of said pin and holds said pin in a tensile state are provided.

8. A front part replacement type finger chuck as set forth in claim 6, wherein a collet chuck which is concentric with the center of rotation of the front end face portion is provided at the front end face portion, said collet chuck comprising means for centering a workpiece on the front part replacement part finger chuck.

9. A front part replacement type finger chuck as set forth in claim 7, wherein a collet chuck which is concentric with the center of rotation of the front end face portion is provided at the front end face portion, said collet chuck comprising means for centering a workpiece on the front part replacement part finger chuck.

10. A front part replacement type finger chuck in which finger shafts are longitudinally slidably and rotatably mounted at positions spaced in the circumferential direction of the outer circumference of a chuck body, said finger chuck comprising a base portion adapted to be fixed to a spindle of a machine tool and a front end face portion adapted to hold a workpiece having a first configuration, said front end face portion comprising a plurality of front end face parts integral with each other, and the front part replacement type finger chuck further comprising means for releasably fixing said front end face portion to said base portion such that said front end face portion can be removed from said base portion when said base portion is fixed to the spindle of the machine tool.

11. A front part replacement type finger chuck as set forth in claim 10, wherein a tapered face concentric with the center of rotation of the chuck is formed at the rear side of the front end face portion, said means for releasably fixing comprises pins each having an engaging dent formed at a circumferential face of the pin and holes in said rear side of the front end face portion at positions spaced in the circumferential direction of said front end face portion said pins being receivable in said holes, wherein a taper mating face, which is fitted in said tapered face, is formed at the front face of the chuck body, and said means for releasably fixing further comprises a rotation operating rod holding each said pin in a tensile state by engaging said engaging dent of said pin.

12. A front part replacement type finger chuck as set forth in claim 10, wherein a collet chuck which is concentric with the center of rotation of the front end face portion is provided at the front end face portion, said collet chuck comprising means for centering a workpiece on the front part replacement part finger chuck.

13. A front part replacement type finger chuck as set forth in claim 11, wherein a collet chuck which is concentric with the center of rotation of the front end face portion is provided at the front end face portion, said collet chuck comprising means for centering a workpiece on the front part replacement part finger chuck.

14. The front part replacement type finger chuck of claim 10, wherein said front end face parts include a clamp seat and a centering member.

* * * * *